United States Patent [19]
Isenberg

[11] 3,787,684
[45] Jan. 22, 1974

[54] BETA ACTIVATED ULTRAVIOLET RADIATION SOURCE SURROUNDED BY A VISIBLE LIGHT PRODUCING FLUORESCENT AGENT

[76] Inventor: Sampson Isenberg, 2400 N. Lakeview, Chicago, Ill. 60612

[22] Filed: Dec. 30, 1970

[21] Appl. No.: 102,785

[52] U.S. Cl. ............................ 250/71 R, 250/106 R
[51] Int. Cl. ........................................... G01n 23/00
[58] Field of Search ............250/71 R, 106 R, 77, 84, 250/71.5 R

[56] References Cited
UNITED STATES PATENTS

| | | | |
|---|---|---|---|
| 2,953,684 | 9/1960 | MacHutchin et al. ............ | 250/71 R |
| 3,470,490 | 9/1969 | Held et al. ......................... | 331/94.5 |
| 3,026,436 | 3/1962 | Hughes ............................. | 250/106 R |
| 3,260,846 | 7/1966 | Feuer ................................ | 250/106 R |
| 3,478,209 | 11/1969 | Feuer ................................ | 250/106 R |
| 3,037,067 | 5/1962 | Bartolomei ...................... | 250/106 R |
| 2,956,162 | 10/1960 | Armistead ....................... | 250/71.5 R |

Primary Examiner—David Schonberg
Assistant Examiner—Ronald J. Stern
Attorney, Agent, or Firm—Wallenstein, Spangenberg, Hattis & Strampel

[57] ABSTRACT

A device having utility as an ultraviolet radiation source comprising a hollow, translucent body formed of an ultraviolet radiation transmitting material. The inner walls of the body define a sealed chamber, and are provided with a thin layer, film, or coating of an ultraviolet radiation emitting phosphor. A low energy beta-electron emitting substance such as tritium is confined within the chamber and is positioned therein to enable the beta-electrons emitted by it to make direct contact with the phosphor. By embedding a fluorescent agent in the material of which the translucent body is formed, or by encapsulating the body in a material containing a fluorescent agent, the device may be utilized to transmit visible light.

11 Claims, 14 Drawing Figures

PATENTED JAN 22 1974 3,787,684
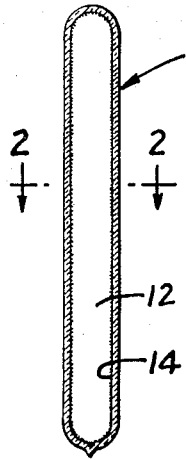
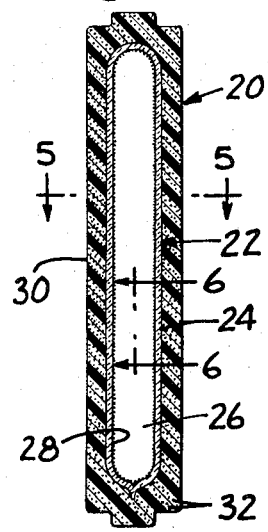
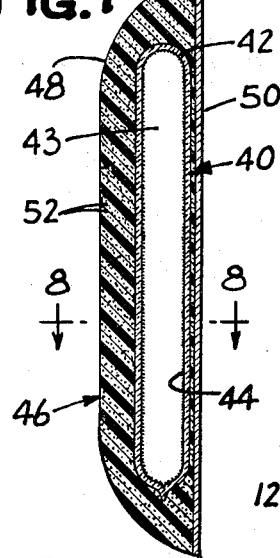
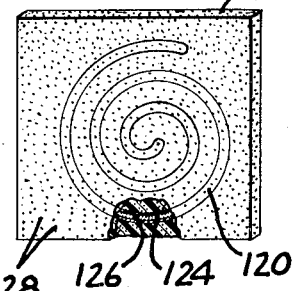
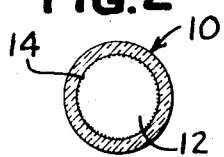
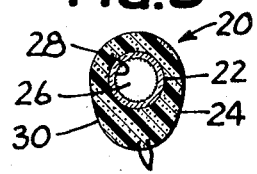
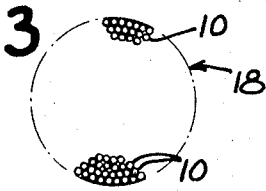
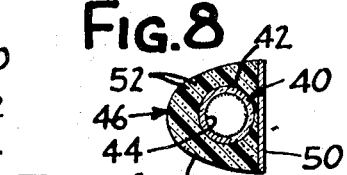
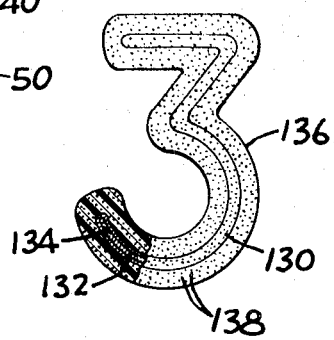
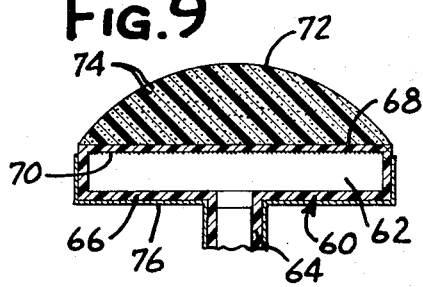
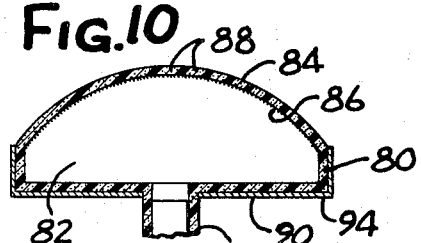
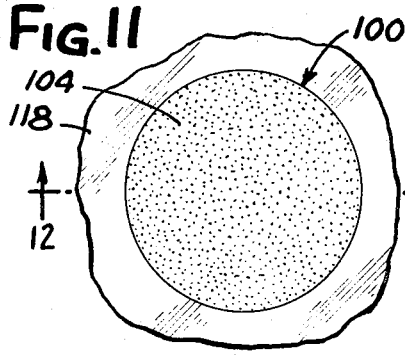
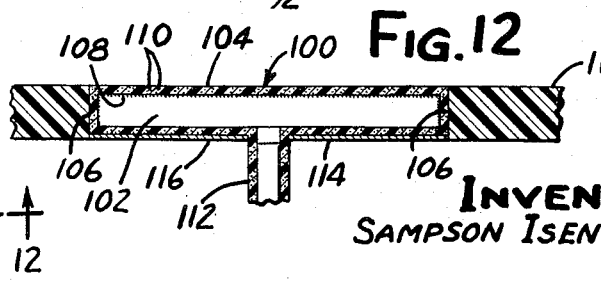
INVENTOR
SAMPSON ISENBERG
by: Wallenstein, Spangenberg, Hattis & Strampel
ATTYS

BETA ACTIVATED ULTRAVIOLET RADIATION SOURCE SURROUNDED BY A VISIBLE LIGHT PRODUCING FLUORESCENT AGENT

The ability of radioactive materials to excite phosphors to cause them to emit visible light has long been recognized and has led to the development of numerous devices which utilizes this phenomenon. So far as is known, the primary, and only, purpose of these prior devices is to emit light in the visible range of the spectrum.

In accordance with one aspect of the present invention, highly useful, longlasting and safe devices are provided which utilize radioactive substances and phosphors to emit radiation in the ultraviolet range of the spectrum. Thus, by way of illustration, the devices of this invention can be used in the form of self-energizing units to emit radiations in one band of the ultraviolet range of the spectrum to cause tanning of the skin, or, in another form, as self-energizing germicidal and deodorizing units or, in still another form, as combined self-energizing skin tanning, and germicidal and deodorizing units, for home, laboratory or industrial use. In accordance with a further aspect of this invention, there are provided devices which utilize radioactive substances and phosphors capable of emitting radiation only in the ultraviolet range of the spectrum for the excitation of fluorescent agents to produce light in the visible range of the spectrum. Whether used for ultraviolet radiation or visible light radiation, the devices of this invention enable the efficient use of the radioactive substances and phosphors employed to provide self-energizing units of the type mentioned at low cost utilizing readily available and safe materials.

Briefly, the devices of this invention, in one form, comprise a hollow, translucent body portion fabricated of an ultraviolet radiation transmitting material, the inner walls of which define a chamber. The walls of the chamber are provided with a thin coating of an ultraviolet radiation emitting phosphor which is in contact with a low energy beta-electron emitting isotope or substance contained in the chamber. By proper selection of the low beta-electron emitting substance and phosphor, a device can be constructed which is, as indicated, capable of transmitting ultraviolet radiation having a wavelength suitable for suntanning, or germicidal or deodorizing effects, or both. In another form, the devices of this invention can comprise a body portion as before, the material of which the body portion is fabricated, however, having particles, for example, of a fluorescent agent dispersed therein. The fluorescent agent in this form of the invention is characterized in that it is capable of excitation by ultraviolet radiations to emit light in the visible band of the spectrum. In a variation of this form of the invention, the body portion is fabricated of an ultraviolet radiation transmitting material which is encapsulated in, or coated with, a fluorescent agent containing material which is capable of transmitting visible light. The devices of this invention can embody reflective surfaces to direct and concentrate the radiations transmitted by them. In addition, they can be formed into any shape desired, and can be made to emit visible light of any desired color or color combination.

The radioactive isotopes or substances having utility in the present invention are low energy beta-electron emitters, that is, they emit beta-electrons having a particle energy of less than one MEV, especially desirably, particle energies of the order of about 0.01 to about 0.2 MEV. Apart from their capability for emitting low energy beta-electrons, the radioactive substances should have a reasonably long half-life, preferably measured in years. The radioactive substances may ge gaseous, liquid or solid in nature, and should, of course, be available commercially and capable of being handled without the need for taking elaborate precautions to insure the safety of manufacturing personnel or the ultimate user. Exemplary of radioactive substances which are useful for the purposes of the present invention are tritium, carbon-14, nickel-63, sulfur-35, promethium-147, and the like. Of this group, tritium is especially preferred. The maximum particle energy of the electrons emitted by tritium is about 0.018 MEV, and tritium has a half life of about 12.5 years. Because it is a gas, tritium lends itself to processing through a closed system thereby minimizing direct contact of the radioactive substance with personnel during fabrication of the devices of this invention. Tritium has the further advantage of enabling gas pressure to be the determinating factor as to the quantity of radioactive substance used in the devices of the present invention, thus facilitating quality control and the production of devices which are uniformly safe for their intended use. In this connection, in the preparation of devices in accordance with the teachings of this invention, excellent results are attained with tritium gas pressures of less than one atmosphere, with pressures of the order of about 0.2 to about 0.8, especially desirably about 0.5, atmosphere being preferred. Over and above the foregoing advantages, the use of tritium facilitates the fabrication of devices in accordance with this invention which enables maximum utilization of the low energy beta-electrons emitted by the tritium.

The phosphors useful in the fabrication of the devices of the present invention can be selected from a wide group, including both inorganic and organic phosphors. Typical of such phosphors are the inorganic crystalline phosphors comprising the silicates, borates, phosphates, oxides, carbonates, iodides, tungstates, vanadates, tellurides, and sulfides of beryllium, calcium, magnesium, barium, strontium, manganese, zinc, cadmium and aluminum, or the like. It is customary to activate the phosphors with controlled, minute quantities of various metals. Exemplary of organic phosphors which can be used are anthracene, pentacene, quinine salicylate, phenol, atropine, rhodamine, benzidine, triphenylmethane, phloroglucinol, salol, and the like.

As indicated above, by proper selection of the radioactive substance and the phosphor, devices can be fabricated in accordance with the present invention which are capable of emitting radiations in any desired band of the ultraviolet spectrum. However, while devices can be made to emit radiations having a wavelength of the order of 500 A°, generally speaking, devices capable of emitting radiations in the 2,000 A° to 3,900 A° region are preferred. Thus, by way of specific illustration, utilizing tritium as the radioactive substance and a phosphor comprising cadmium iodide activated with lead, a device can be made which is capable of emitting radiations in the 2,537 A° range of the ultraviolet spectrum. Radiations of this intensity can effectively destroy most air-borne bacteria and, thus, the device can function as a germicidal and deodorizing unit. Again, by way of specific illustration, a device can be produced to provide radiation in the 3,130 A° band of the ultraviolet spectrum by using tritium as the radioactive substance and zinc sulfide activated with cerium and europium as the phosphor. Radiations in this range are capable of tanning the human skin and the device, thus, can serve as an efficient, longlasting suntanning unit. Both types of phosphors can, of course, be combined in the same device to provide a unit capable of performing each of the aforementioned functions. Still further, by way of illustration, a device capable of emitting radiations in the 3,650 A° region of the ultraviolet spectrum can be prepared with tritium as the radioactive substance and calcium phosphate activated with cerium and gadolinium as the phosphor. Ultraviolet radiations of this order of magnitude can excite many fluorescent agents to produce light in the visible range of the spectrum. Thus, by utilizing a radioactive substance which emits beta-electrons having extremely low particle energy levels in conjunction with a phosphor which is excited by such low energy particles to produce ultraviolet radiations, a safe, longlasting device can be produced in accordance with the teachings of the present invention which can emit light of any desired color or color combinations in the visible light range of the spectrum. Typical of fluorescent agents which are useful for this purpose are acetylsalicylic acid, alizarin, aminophyllin, aniline, atropine sulfate, barium succinate, butyrone, cadmium sulfide, calcium mandelate, chlorophyll, chromium stearate, cobaltous resinate, emetine, fluorescein, gallium gluconate, hydrastin, hyoscyamin, lead naphthenate, lithium salicylate, magnesium 6-hydroxyquinoline, manganese resinate, mesobilirubin, methyl hexaline, musk xylol, B-naphthol, naphthalene, nicotine, orcin, phenanthrene, podophyllin, potassium salicylate, proto-porphyrin, resorcinol, rhodacene, riboflavin, samarium gluconate, sodium barbiturate, strontium stearate, theobromine, tin stearate, uracil, vanadyl cyanide, zinc palmitate, zinc 8-hydroxyquinoline, zinc sulfide, zinc valerate, calcium tungstate, and the like, and compatible mixtures thereof.

The devices of the invention, both as to their construction and method of operation, together with additional objects and advantages thereof, will be more fully understood from the following description of illustrative specific embodiments when read in conjunction with the accompanying drawing in which:

FIG. 1 is an enlarged vertical sectional view of an embodiment of one form of a device of this invention;

FIG. 2 is a sectional view taken substantially along line 2—2 of FIG. 1;

FIG. 3 is an end view of another embodiment of a device of this invention which embodies the form of the invention shown in FIG. 1;

FIG. 4 is an enlarged vertical sectional view of an embodiment of yet another form of a device of the present invention;

FIG. 5 is a sectional view taken substantially along line 5—5 of FIG. 4;

FIG. 6 is a fragmentary sectional view taken substantially along line 6—6 of FIG. 4;

FIG. 7 is an enlarged vertical sectional view of an embodiment of yet another form of a device of this invention;

FIG. 8 is a sectional view taken substantially along line 8—8 of FIG. 7;

FIGS. 9 and 10 are vertical sectional views of embodiments of other forms of devices of the present invention;

FIG. 11 is a fragmentary top plan view of an embodiment of still another form of a device of this invention;

FIG. 12 is a vertical sectional view taken substantially along line 12—12 of FIG. 11; and FIGS. 13 and 14 are side views in elevation, partly in section, of shaped articles comprising embodiments of the devices of the present invention.

Referring, now, in greater detail to FIGS. 1 and 2 of the drawing, the embodiment of the invention shown comprises a hollow, elongated, tubular body portion 10 which is sealed at both ends. The body portion 10 may be fabricated of any suitable ultraviolet radiation transmitting material such as glass or a plastics material which is impermeable and chemically resistant to the radioactive substances and phosphors having utility for the purposes of this invention. The inner wall of the body portion 10 defines a chamber 12 adapted to hold a radioactive isotope or substance which may be in a solid, liquid or gaseous state. In the embodiments of the devices illustrated, gaseous tritium is employed as the radioactive substance. The inner wall of the body portion 10 has a coating, film or layer 14 of a phosphor, or combination of phosphors, thereon. As indicated, the phosphors employed in the devices are characterized in that they are capable of excitation by low energy beta-electrons to produce ultraviolet radiation. The phosphors advantageously are utilized in a crystalline or particulate form and may be adhered or bonded to the inner wall of the body portion in any manner known in the art. Thus, by way of illustration, the particles of the phosphor can be bonded to the surface of the inner walls of the body portion 10 with inorganic adhesives such as sodium silicate or potassium silicate. The average particle size of the phosphor employed is somewhat variable. However, the generally optimum objectives of the invention are retained with phosphor particle sizes ranging from about 1 to about 200, especially desirably about 2 to about 100, microns. The depth of the phosphor coating, film or layer 14, also, is variable, and will depend in large measure upon the energy level of the beta-electrons emitted by the radioactive substance in the chamber 12. Generally speaking, however, utilizing low energy beta-electron emitting radioactive substances of the type described hereinabove, excellent results can be achieved with phosphor depths of the order of about 1 to about 20, usually about 3 to about 15, microns.

Since the trajectory range of the beta-electrons emitted by tritium is of the order of about 2.5 to about 3 millimeters, the dimensions of the chamber 12 should be such that the beta-electrons emitted by the tritium in the chamber 12 will be substantially completely absorbed by the phosphor coating, film or layer 14, and will not penetrate the walls of the body portion 10. Further, in this same connection, by employing a chamber having a small cross-sectional area, the quantity of tritium introduced into the chamber can be regulated to maximize utilization of the energy of the beta-electrons emitted by the tritium. Stated differently, the devices of the present invention enable the use of low energy beta-electron emitting isotopes or substances in concentrations such that any loss of energy of the electrons due, for example, to quenching, or collision between the electrons, is minimized and, as a consequence, a greater number of the electrons make contact with the phosphor, or phosphors, on the surface of the chamber. This more efficient use of the emissions of the radioactive substance not only enables the production of devices which are safe to use, but, also, has significant cost advantages. As indicated earlier hereinabove, the pressure of the tritium in the chamber 12 will be less than atmospheric pressure to provide greatest security against leakage from the sealed ends of the body portion 10. A wide variation of energy levels of tritium can be introduced into the chamber 12 while maintaining internal pressures of one atmosphere or less.

As shown in FIG. 3, a unit for providing a substantial amount of ultraviolet radiation, and for concentrating the radiation upon a desired object or surface, can be made by forming a bundle 18 comprised of a plurality of devices corresponding to those shown in FIGS. 1 and 2. The bundle 18 may be formed by adhering or fusing the outer walls of the devices together or by wrapping or binding them together with a suitable material. In this latter connection, the wrapping or binding material may be a radiation insulating matrix thereby enabling the ultraviolet radiations produced by the multiplicity of wrapped or bound devices to be projected only from either one, or both, ends of the bundle. The bundle, of course, may be of any desired shape, size and cross-sectional area.

Referring, now, to FIGS. 4, 5 and 6 of the drawing, the embodiment of the device illustrated and designated generally by reference numeral 20 incorporates an inner, ultraviolet radiation emitting unit 22 which, like the device shown in FIGS. 1 and 2, comprises a hollow, elongated, tubular body portion 24, the ends of which have been sealed. The inner walls of the body portion 24 define a chamber 26 which contains a low energy beta-electron emitting radioactive substance such as tritium. The surface of the inner walls of the body portion 24, as in the device of FIGS. 1 and 2, is provided with a thin coating, film or layer 28 of a phosphor, or mixture of phosphors, capable of excitation by the low energy beta-electrons emitted by the radioactive substance in the chamber 26 to produce ultraviolet radiations. The device 22 is surrounded by, or encapsulated in, an outer wall portion or shell 30 formed of a light transmitting material such as glass, quartz, mica or clear plastics material. Embedded in the shell 30, and substantially uniformly dispersed therein, are particles 32 of a fluorescent agent, the particles being characterized in that they are capable of excitation by ultraviolet radiations in the 3,650 A° band of the spectrum to produce visible light. Particles of different fluorescent agents can, of course, be employed to produce light of more than one color. The wall portion or shell 30 may be of substantially uniform thickness, or, as shown in FIG. 5, it may be made thicker along one side to impart a "lens" effect to the device 20.

The embodiment of the device of this invention, shown in FIGS. 7 and 8, incorporates an inner, ultraviolet radiation transmitting portion 40 which, like the previously described embodiments of the invention, comprises a hollow, elongated tubular body portion 42 which is sealed at its ends. The inner walls of the body portion 42 define a chamber 43 for holding a radioactive substance of the type referred to hereinabove. The surfaces of the inner walls of the body portion 42 are provided with a coating, film or layer 44 of a phosphor, or phosphors, capable of being excited to produce ultraviolet radiations in the 3650 A° band of the spectrum. The ultraviolet radiation transmitting portion 40 is encased or encapsulated in a light transmitting shell or housing 46. The shell or housing 46 has a generally convex, light transmitting front wall 48, and a substantially planar, ultraviolet radiation reflecting rear wall 50. The front wall 48 has embedded in it particles 52 of a fluorescent agent capable of converting ultraviolet radiation into visible light. Mixtures of fluorescent agents, of course, can be employed to provide different color effects. The rear wall 50 is coated on its inner surface with a material, such as aluminum, silver, cadmium or titanium dioxide, capable of reflecting transverse rays of ultraviolet radiation back into the front wall 48.

The embodiment of the invention illustrated in FIG. 9 of the drawing comprises a hollow, disc-shaped, ultraviolet radiation transmitting body 60, the inner walls of which define a chamber 62 for holding a radioactive substance such as tritium. A hollow, tubular extension 64 is joined to the body 60 substantially centrally of the inner wall 66 thereof, and is sealed off from the chamber 62. The extension 64 can be used to anchor the device in a support member (not shown). The inner surface of the generally flat outer wall 68 of the body 60 is provided with a coating, film or layer 70 of a phosphor, of mixture of phosphors, which, upon excitation by low energy beta-electrons emitted by the radioactive substance in the chamber 62, is capable of transmitting ultraviolet radiations in the 3,650 A° band of the spectrum. Joined to the body 60 at the outer wall 68 thereof, is a light transmitting, generally convex cover portion 72 in which are embedded particles 74 of a fluorescent agent, or a mixture of such agents, which are capable of excitation by the ultraviolet radiation emitted by the body 60 to produce light in the visible range of the spectrum. A disc-shaped housing 76 is provided to receive the body 60 and the extension 64. The housing 76 advantageously is fabricated of an ultraviolet radiation reflecting material such as aluminum, or the surfaces thereof which are in contact with the body 60 are provided with a coating of an ultraviolet radiation reflecting material such as aluminum, cadmium, silver, titanium dioxide, or the like.

In FIG. 10, the embodiment of the invention illustrated comprises a disc-shaped, ultraviolet radiation transmitting body 80, the walls of which define a chamber 82 for holding a radioactive substance such as tritium. The outer wall 84 of the device has a generally convex configuration, and is provided on its inner surface with a coating 86 of a phosphor, or mixture of phosphors, capable, upon excitation by the low energy beta-electrons emitted by the radioactive substance in the chamber 82, of producing ultraviolet radiations in the 3,650 A° band of the spectrum. The outer wall 84, further, has embedded in it particles 88 of a fluorescent agent, or a mixture of such agents, which will respond to the ultraviolet radiations to produce visible light. Joined to the body 80, centrally of the inner wall 90 thereof, is a tubular support extension 92. A housing 94, having an inner surface capable of reflecting ultraviolet radiation, is provided for the body 80.

The embodiment of the invention illustrated in FIGS. 11 and 12, like the two previously described embodiments, comprises a generally disc-shaped ultraviolet radiation transmitting body 100, having a chamber 102 for holding a radioactive substance. The inner surfaces of the outer, flat wall 104, and the side wall 106, are coated with a thin film or layer 108 of a phosphor, or mixture of phosphors, of the type used in the two previously described embodiments. The outer wall 104, and the side wall 106, in addition, have embedded in them particles 110 of a fluorescent agent, or agents, capable of emitting light in the visible range of the spectrum in response to ultraviolet radiation. A tubular support extension 112 is joined to the body 100. The inner wall 114 of the body 100 is in contact with an ultraviolet radiation reflecting surface 116. The body 100 is completely ringed by, and supported in, a plastics material 118 capable of transmitting light radiations emitted by the body 100. The plastics material 118 advantageously is of a color different from the color of the light waves emanating from the walls 104 and 106 of the body 100 thereby to give a multicolor effect.

In the embodiments shown in FIGS. 9 through 12, the chamber for holding the radioactive isotope or substance can, in each instance, be used as a receiving chamber for a device as illustrated in FIG. 1. Coating of the inner surfaces of the receiving chamber walls with a phosphor, as described, is optional in this case, and will depend upon the light transmitting effects sought to be attained with the devices.

In FIGS. 13 and 14, there are shown constructions which illustrate the versatility of the devices of the present invention. The construction shown in FIG. 13 comprises a continuous, convoluted, elongated, hollow, tubular ultraviolet radiation body 120 encased, or encapsulated, in a light transmitting panel 122 fabricated, for instance, of a clear glass or plastics material. The body 120 is sealed at both ends, and the walls thereof define a chamber 124 for holding a radioactive substance. The inner surface of the walls of the body 120 has a coating, film or layer 126 of a phosphor, or mixture of phosphors, capable of emitting ultraviolet radiation in the 3,650 A° range of the spectrum. The panel 122 has particles 128 of a fluorescent agent, or a mixture of such agents, embedded therein, the particles, as before, responding to ultraviolet radiation of the wavelength indicated to produce visible light.

The construction shown in FIG. 14 comprises a hollow, tubular ultraviolet radiation body 130 in the shape of the number "3". As in the previously described construction, the ends of the body 130 are sealed, and the walls thereof define a chamber 132 for holding a radioactive substance such as tritium. The inner surface of the walls of the body 130 are provided with a thin coating, film or layer 134 of a phosphor, or mixture of phosphors. The body 130 is encased, or encapsulated, in a clear light transmitting material 136 having embedded therein particles 138 of a fluorescent agent, or mixture of fluorescent agents, capable of producing visible light in response to the ultraviolet radiations transmitted by the body 130. The fluorescent agents used desirably provide visible light of different colors, and are dispersed in the material 136 in a manner such that separate zones, each radiating light of a different color, are visible in the construction.

As stated previously hereinabove, the low energy beta-electron emitting isotope or substance may be in a solid, liquid or gaseous state. Thus, by way of specific illustration, the low energy beta-electron emitting substance may comprise solid particles of promethium-147 dispersed or suspended in a clear, inert liquid medium such as mineral oil or glycerin. The quantity of the solid isotope employed in the liquid medium is variable. However, from the standpoint of safety and economic considerations, the quantities used will range from about 0.1 to about 1 or 2 percent, by weight, of the dispersion or suspension. The size of the particles used advantageously will range from about 1 to about 100 microns.

It will be apparent from the foregoing description that the devices, apart from their utility as a source of ultraviolet radiation to bring about tanning of the human skin, or to provide deodorizing or germicidal effects, also have important uses in other areas. Thus, for example, the devices can be used as signals or warning lights on motor vehicles, trailers, boats, and bicycles. In addition, they can be used as vehicle dashboard or clock dial lights, or as a source of ultraviolet radiation for illuminating dials, telephone buttons, panels, or the like containing luminous materials. More specifically in this latter connection, by selecting a phosphor which emits radiation in the 3,650 A° region, and by utilizing a nickel-cobalt glass tube that screens out radiations in the visible part of the spectrum but allows the passage of ultraviolet radiations in the 3,650 A° region, a compact, self-contained and self-energized source of 3,650 A° radiation is obtained which can be used, for example, to illuminate fluorescent treated watch and clock dials, to inspect foods, in laboratory studies, and the like. Other uses and modifications of the devices will, of course, suggest themselves to those skilled in the art in the light of the foregoing description. It should be understood, therefore, that the present invention includes all such modifications which fall within the scope of the appended claims.

What is claimed is:

1. A device having utility as an ultraviolet radiation generated light source comprising a hollow, translucent body portion formed of an ultraviolet radiation transmitting material having dispersed therein particles of a fluorescent agent capable of excitation by ultraviolet radiations to produce visible light, the inner walls of said body portion defining a chamber, a thin coating of an ultraviolet radiation emitting phosphor on the walls of the chamber, said phosphor being capable of excitation by low energy beta-electrons having a particle energy of about 0.01 to about 0.2 MEV to produce only ultraviolet radiation having a wavelength sufficient to cause the fluorescent agent particles to produce visible light, and a low energy beta-electron emitting substance in said chamber, said substance being capable of emitting beta-electrons having a particle energy of about 0.01 to about 0.2 MEV.

2. A device as claimed in claim 1 wherein the beta-electron emitting substance is tritium.

3. A device as claimed in claim 1 wherein a phosphor, or a mixture of phosphors, is used which is capable of emitting ultraviolet radiation having a wavelength of about 3,650 angstroms.

4. A device as claimed in claim 1 wherein the hollow, translucent body portion comprises a small diameter cylinder, the ends of which are sealed.

5. A device as claimed in claim 3 wherein the phosphor is calcium phosphate activated with cerium and gadolinium.

6. A device as claimed in claim 3 wherein the phosphor is zinc sulfide activated with cerium and europium.

7. A device as claimed in claim 1 wherein the beta-electron emitting substance is in the form of solid particles dispersed in an inert liquid.

8. A device as claimed in claim 1 wherein the beta-electron emitting substance is sealed from the group consisting of tritium, promethium-147, sulfur-35, nickel-63 and carbon-14.

9. A device for transmitting light in the visible range of the spectrum comprising a hollow, translucent body portion formed of an ultraviolet radiation transmitting material, the inner walls of which define a chamber and the outer surface of which has a layer of a fluorescent agent capable of excitation by ultraviolet radiations to produce visible light, a thin coating of an ultraviolet radiation emitting phosphor on the inner walls of the chamber, said phosphor being capable of excitation by low energy beta-electrons having a particle energy of about 0.01 to about 0.2 MEV to produce only ultraviolet radiation having a wavelength sufficient to cause the fluorescent agent on the outer surface of the body portion to produce visible light, and a low energy beta-electron emitting substance in the chamber of the body portion, said substance being capable of emitting beta-electrons having a particle energy of about 0.01 to about 0.2 MEV.

10. A device as claimed in claim 9 wherein the low energy beta-electron emitting substance is tritium.

11. A device as claimed in claim 9 wherein the body portion is formed of a material capable of transmitting ultraviolet radiations in the 3,000 A° to 3,900 A° region of the spectrum and screens out radiations in the visible region of the spectrum.

* * * * *